United States Patent
Kitazoe et al.

(10) Patent No.: US 6,947,890 B1
(45) Date of Patent: Sep. 20, 2005

(54) ACOUSTIC SPEECH RECOGNITION METHOD AND SYSTEM USING STEREO VISION NEURAL NETWORKS WITH COMPETITION AND COOPERATION

(75) Inventors: Tetsuro Kitazoe, 2-22-2 Gakuen Kibanadai Minami, Miyazaki, 889-2153 (JP); Sung-Ill Kim, Aichi (JP); Tomoyuki Ichiki, Miyazaki (JP)

(73) Assignee: Tetsuro Kitazoe, Miyazaki (JP)

( * ) Notice: Subject to any disclaimer, the term of this patent is extended or adjusted under 35 U.S.C. 154(b) by 551 days.

(21) Appl. No.: 09/580,449

(22) Filed: May 30, 2000

Related U.S. Application Data

(60) Provisional application No. 60/143,954, filed on Jul. 15, 1999.

(30) Foreign Application Priority Data

May 28, 1999 (JP) .......................................... 11-150284

(51) Int. Cl.[7] ............................................. G10L 15/16
(52) U.S. Cl. .......................... 704/232; 704/239; 706/20
(58) Field of Search ................................ 704/231, 232, 704/236, 239, 240; 706/20, 27, 28, 31

(56) References Cited

U.S. PATENT DOCUMENTS

| | | | |
|---|---|---|---|
| 4,975,961 A | * 12/1990 | Sakoe ........................ | 704/232 |
| 5,059,814 A | * 10/1991 | Mead et al. .................. | 706/33 |
| 5,175,793 A | * 12/1992 | Sakamoto et al. .......... | 704/200 |
| 5,410,635 A | * 4/1995 | Sakoe ........................ | 704/232 |
| 5,638,486 A | * 6/1997 | Wang et al. ................. | 704/236 |
| 5,809,461 A | * 9/1998 | Inazumi ...................... | 704/232 |
| 5,933,807 A | * 8/1999 | Fukuzawa ................... | 704/275 |
| 5,960,391 A | * 9/1999 | Tateishi et al. ............. | 704/232 |
| 6,041,299 A | * 3/2000 | Schuster et al. ............ | 704/232 |
| 6,125,345 A | * 9/2000 | Modi et al. .................. | 704/240 |
| 6,151,592 A | * 11/2000 | Inazumi ...................... | 706/16 |

OTHER PUBLICATIONS

Maren et al., "A multilayer cooperative/competitive method for creating hierarchical structures by clustering maximally–related nodes," IEEE International Conference on Neural Networks, Jul. 1988, vol. 2, pp. 95 to 105.*

T. Kitzazoe, et al., *Sequential Stereoscopic Vision and Hysteresis*, Proc. of Fifth Int. Conf. on Neural Information Processing, pp. 391–396, 1998.

(Continued)

*Primary Examiner*—Richemond Dorvil
*Assistant Examiner*—Martin Lerner
(74) *Attorney, Agent, or Firm*—Morgan, Lewis & Bockius LLP

(57) ABSTRACT

A method and system are provided for speech recognition. The speech recognition method includes the steps of preparing training data representing acoustic parameters of each of phonemes at each time frame; receiving an input signal representing a sound to be recognized and converting the input signal to input data; comparing the input data at each frame with the training data of each of the phonemes to derive a similarity measure of the input data with respect to each of the phonemes; and processing the similarity measures obtained in the comparing step using a neural net model governing development of activities of plural cells to conduct speech recognition of the input signal. In the processing step, each cell is associated with one respective phoneme and one frame, a development of the activity of each cell at each frame in the neural net model is suppressed by the activities of other cells on the same frame corresponding to different phonemes, and the development of the activity of each cell at each frame being enhanced by the activities of other cells corresponding to the same phoneme at different frames. In the process, the phoneme of a cell that has developed the highest activity is determined as a winner at the corresponding frame to produce a list of winners at respective frames. A phoneme is outputted as a recognition result for the input signal in accordance with the list of the winners at the respective frames that have been determined in the step of processing.

20 Claims, 12 Drawing Sheets

OTHER PUBLICATIONS

D. Reinmann et al., *Stereo Vision by Self-organization*, Biol. Cybern, vol.71, pp. 17–26, 1994.

Y. Yoshitomi, et al., *Neurol Nets Pattern Recognition Equation for Stereoscopic Vision*, Trans. IPS, Japan, pp. 29–38, 1998.

S. Nakagawa *Ability and Limitation of Statistical Language Model*, Proc. of ASJ, Japan, pp. 23–26, 1998.

R. Lippmann, *An Introduction to Computing with Neural Nets*, IEEE ASSP Mag., 4(2), pp 4–22, 1987.

T. Kitazoe et al., *Acoustic Speech Recognition Model by Neural Nets Equation with Competition and Cooperation*, Transactions of the Technical Committee on Psychological and Physiological Acoustics, H–98–63 Acoustical Society of Japan, pp. 1–6, Tech. Rep. IEICD. SP98–45, Jul. 17, 1998.

T. Kitazoe et al., *Acoustic Speech Recognition Model by Neural Net Equation with Competition and Cooperation*, Proc. of Fifth Int. Conference. on Spoken Language Processing, vol. 7, pp. 3281–3284, Nov. 30–Dec. 4, 1998.

T. Kitazoe et al., *Speech Recognition using Stereovision Neural Network Model*, Proc. of The Fourth Int. Symp. on Artificial Life and Robotics (AROB 4th '99), Oita, Japan, pp. 576–579, Jan. 19–22, 1999.

T. Kitazoe et al., *Neural Net Equations with Competition and Cooperation for Speech Recognition*, Information Processing Society of Japan, SIG NOtes SLP 25–5, pp. 25–30, Feb. 5, 1999.

T. Kitazoe et al., *Application of Stereovision Neural Network to Continuous Speech Recognition*, Proc. of The Int. Symp. on Artificial Life an Robotics (AROB 5th'00), Oita Japan, 26–28, pp. 137–140, Jan. 2000.

T. Kitazoe, et al., *Acoustic Speech Recognition by Two and Three Layered Neural Networks with Competition and Cooperation*, Proc. of SPECOM '99, Int. Workshop, Speech and Computer, Moscow, pp. 111–114, Oct. 4–7, 1999.

Amari, S. et al., *Competition and Cooperation in Neural Nets*, Systems Neuroscience pp. 119–165, Academic Press, 1977.

\* cited by examiner $\alpha > 0$ $\alpha < -E^2/4.5C$

ACOUSTIC SPEECH RECOGNITION METHOD AND SYSTEM USING STEREO VISION NEURAL NETWORKS WITH COMPETITION AND COOPERATION

This application claims the benefit of Japanese Application No. 11-150284, filed in Japan on May 28, 1999, which is hereby incorporated by reference. This application also claims the benefit of U.S. Provisional Application No. 60/143,954, filed on Jul. 15, 1999, which is hereby incorporated by reference.

This application also incorporates by reference the following documents:

T. Kitazoe et al., *Acoustic Speech Recognition Model by Neural Nets Equation with Competition and Cooperation*, Transactions of the Technical Committee on Psychological and Physiological Acoustics, H-98-63 Acoustical Society of Japan, pp. 1–6, Tech. Rep. IEICD. SP98-45, Jul. 17, 1998.

T. Kitazoe et al., *Acoustic Speech Recognition Model by Neural Net Equation with Competition and Cooperation*, Proc. of Fifth Int. Conference on Spoken Language Processing, Vol.7 pp. 3281–3284, Nov. 30–Dec. 4, 1998

T. Kitazoe et al., *Speech Recognition using Stereovision Neural Network Model*, Proc. of The Fourth Int. Symp. on Artificial Life and Robotics (AROB $4^{th}$ '99), Oita, Japan, pp. 576–579, Jan. 19–22, 1999

T. Kitazoe et al., *Neural Net Equations with Competition and Cooperation for Speech Recognition*, Information Processing Society of Japan, SIG Notes SLP 25-5, pp. 25–30, Feb. 5, 1999.

S. Nakagawa *Ability and Limitation of Statistical Language Model*, Proc. of ASJ, Japan, pp. 23–26, 1998

R. Lippmann, *An Introduction to Computing with Neural Nets*, IEEE ASSP Mag.,4(2), pp4–22, 1987

Amari, S. et al., *Competition and Cooperation in Neural Nets*, Systems Neuroscience pp. 119–165, Academic Press, 1977

D. Reinmann et al., *Stereo Vision by Self-organization*, Biol. Cybern. Vol.71, pp. 17–26, 1994

Y. Yoshitomi, et al., *Neural Nets Pattern Recognition Equation for Stereo Vision*, Trans. IPS, Japan, pp. 29–38, 1998

T. Kitazoe, et al., *Sequential Stereoscopic Vision and Hysteresis*, Proc. of Fifth Int.Conf. on Neural Information Processing, pp. 391–396, 1998

T. Kitazoe et al., *Application of Stereovision Neural Network to Continuous Speech Recognition*, Proc. of The Fifth Int. Symp. on Artificial Life an Robotics (AROB $5^{th}$ '00), Oita Japan, 26–28, January 2000

BACKGROUND OF THE INVENTION

1. Field of the Invention

The present invention relates to a method and an apparatus for recognizing speech by identifying the type of each phoneme constituting a continuous speech inputted.

2. Discussion of the Related Art

In the field of acoustic speech recognition technology, further improvement of the recognition rate is the most important agenda. Recently, many studies have been conducted for improving large-vocabulary continuous speech recognition. There are two main trends in the art. One is to develop good acoustic models that improve the recognition rate of each phoneme. The other is to develop language models that improve recognition of a word or a sentence using linguistic or grammatical knowledge regarding connections among phonemes. In the former, models based on Hidden Markov Model (HMM) and improvements thereof have generally been studied. Currently, more focuses are on improvement of the latter model. However, with respect to recognition of a whole sentence, it has been realized that a 10–20% improvement on the language model is equivalent to only a 1–2% improvement in the acoustic model. Therefore, a large improvement can not be expected from the language model. On the other hand, the acoustic model is reaching its technical limitation; it is difficult to expect more development based on the HMM.

FIG. 10 is a block diagram showing a structure of a conventional speech recognition device. A continuous speech is input at a continuous speech input section 1, and is converted to a digital-format speech signal. At a speech signal processing section 2, the speech signal is divided into pieces having a constant time frame (also referred simply as a frame). The speech processing section 2 then processes the signal in each frame to extract acoustic parameters (normally, Mel-frequency cepstral coefficients: MFCC) for each frame. At a similarity calculation section 3, data that consists of the extracted acoustic parameters are compared with reference training data, which have been studied and statistically processed for each phoneme to calculate a similarity between the inputted data and the training data of each phoneme. A speech recognition section 4 inputs the thus calculated similarities and conducts phoneme recognition using the HMM model. At that time, the speech recognition section 4 determines optimal borders between phonemes by referencing to the recognition result for each frame and by referencing to an average length of each phoneme and dictionary knowledge. A word-level match section 5 identifies words based upon a series of phonemes that have been determined in this way. A sentence-level match section 6 then identifies a sentence as a collection of the words that have been identified at the word-level match section 6. At the sentence match section 6, sentence candidates are nominated, and evaluated in terms of the grammar and the meaning. If the candidate sentence does not have any problems in terms of the grammar and the meaning, the sentence recognition is completed at the sentence-level recognition section 6. Otherwise, the result is fed back to the word-level match section 5 and phoneme recognition section 4 in order to evaluate a second candidate. Such a conventional speech recognition scheme has been unable to achieve a desired high recognition rate.

SUMMARY OF THE INVENTION

Accordingly, the present invention is directed to a speech recognition method and apparatus that substantially obviate one or more of the problems due to limitations and disadvantages of the related art.

An object of the present invention is to provide a speech recognition method and apparatus that uses speech recognition means capable of substantially improving a recognition rate, as compared with the conventional hidden Markov model (HMM).

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a method for speech recognition, including the steps of preparing training data representing acoustic parameters of each of phonemes at each time frame; receiving an input signal representing a sound to be recognized and converting the input signal to input data; comparing the input data at each frame with the training data of each of the phonemes to derive a similarity measure of the input data with respect to each of the phonemes; processing the similarity measures obtained in the comparing step using a neural net model governing development of activities of plural cells to conduct speech recognition of the input signal, each cell being associated with one respective phoneme and one frame, a development of the activity of each cell at each frame in the neural net model being suppressed by the activities of other cells on the same frame corresponding to different phonemes, the development of the activity of each cell at each frame being enhanced by the activities of other cells corresponding to the same phoneme at different frames, the phoneme of a cell that has developed the highest activity being determined as a winner at the corresponding frame to produce a list of winners at respective frames; and outputting a phoneme as a recognition result for the input signal in accordance with the list of the winners at the respective frames that have been determined in the step of processing.

In another aspect, the present invention provides a speech recognition device, including a training unit for storing training data representing acoustic parameters of each of phonemes at each time frame; a signal input unit for receiving an input signal representing a sound to be recognized and for converting the input signal to input data; a similarity calculation unit for comparing the input data at each frame with the training data of each of the phonemes to derive a similarity measure of the input data with respect to each of the phonemes; and a processing unit for processing the similarity measures obtained by the similarity calculation unit using a neural net model governing development of activities of plural cells to conduct speech recognition of the input signal, each cell being associated with one respective phoneme and one frame, a development of the activity of each cell at each frame in the neural net model being suppressed by the activities of other cells on the same frame corresponding to different phonemes, the development of the activity of each cell at each frame being enhanced by the activities of other cells corresponding to the same phoneme at different frames, the phoneme of a cell that has developed the highest activity being determined as a winner at the corresponding frame to produce a list of winners at respective frames, the processing unit outputting a phoneme as a recognition result for the input signal in accordance with the list of the winners at the respective frames that have been determined.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The present invention utilizes, as its acoustic model, a neural net model based on a principle that is significantly different from the conventional Hidden Markov Model. The present inventors previously studied the function of stereovision in human brains. In the human stereovision, a person can almost instantly recognize a stereovision of an object by comparing two 2-dimensional images of the object, which are projected onto the retinas of left and right eyes, respectively, and by processing their similarity by a neural net in his/her brain. The present inventors conceived that this stereovision neural net function may be applicable to improving the process of similarity calculation between input data of speech information and reference training data. Based on this conception, from the above-mentioned stereovision neural net scheme for the stereoscopic vision, the present inventors have developed a unique stereovision neural net scheme that is suitable for an acoustic model in speech recognition. As will be explained below in detail, this newly developed scheme was implemented in an actual system and a significant improvement on the speech recognition rate was achieved.

In processing the similarity in the stereovision neural net for stereoscopic vision, relevant equations contain a competition term and a cooperation term. The competition term functions to restrict the activity level (excitation level) of a neuron (cell) corresponding to a certain pixel of an image by the activity level of a neuron corresponding to another pixel. Conversely, the cooperative term functions to emphasize the activity level of a certain neuron by the activity level of another neuron corresponding to a different pixel. In the present invention, the newly developed stereovision neural net equation processes input data that is an object of speech recognition and training data for each phoneme that is to be compared with the input data, instead of left and right two images for stereoscopic vision. This way, similarity measures are calculated to determine a phoneme as a recognition result.

Figure 1:
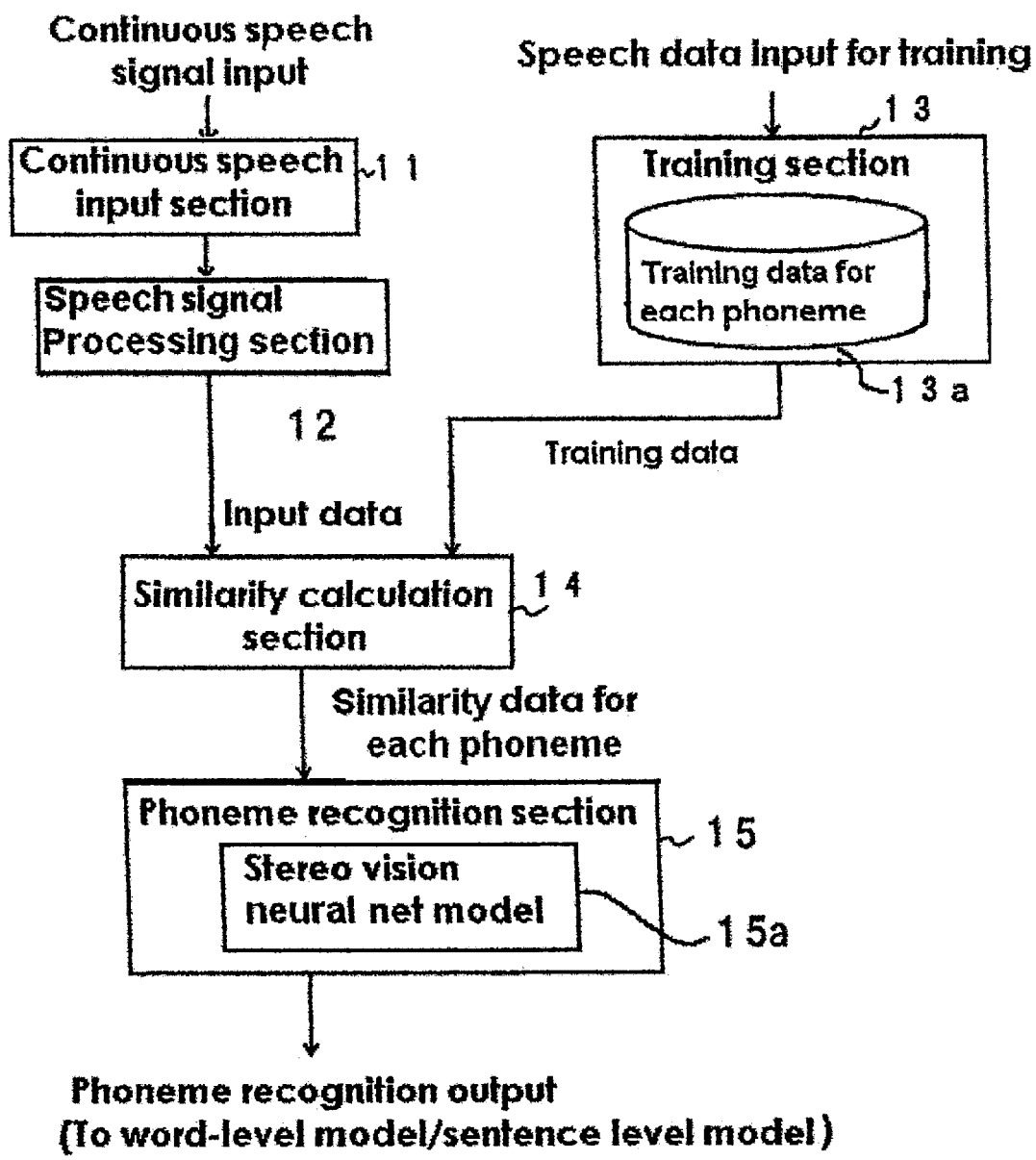
FIG. 1 shows a basic structure of the present invention.

FIG. 1 shows a basic construction of the present invention. A continuous speech signal, which is an object to be recognized, is inputted into a continuous speech signal input section 11. The input signal is divided into a plurality of frames having a fixed time interval at a speech signal processing section 12, and acoustic parameters are extracted from the input signal.

The continuous speech signal input section may be implemented through a microphone or the like. The speech signal processing section 12 may be implemented in the form of software and/or hardware. For example, a signal processor, analog/digital converter, and/or other hardware components known in the art may be used to implement this component.

A training section 13 stores training data 13a. At the training section 13, speech data that become recognition references have been inputted and learning (training) processes have been carried out to extract acoustic parameters for every frame with respect to each reference phoneme in advance. The resultant data constitute the training data 13a. The training section 13 may be implemented in the form of software and/or hardware having an appropriate database storing the training data 13a, for example.

A similarity calculation section 14 compares the input data outputted from the speech signal processing section 12 with each phoneme of the training data 13a at each frame to calculate a similarity measure with respect to each phoneme, creating similarity data. The thus created similarity data are outputted to a speech recognition section 15. This similarity calculation section 13 may also be implemented in the form of software and/or hardware.

The speech recognition section 15 is equipped with a neural net model 15a, which is based on a stereovision equation having the above-mentioned competitive term and cooperative term. The speech recognition section 15 processes the similarity data corresponding to each phoneme with the neural net model 15a. As a result, the neural net converges to yield only a single phoneme as the winner. The resultant phoneme is then outputted as a phoneme recognition output. Here, the neural net model 15a preferably is realized in a computer program on a computer.

Figure 10:
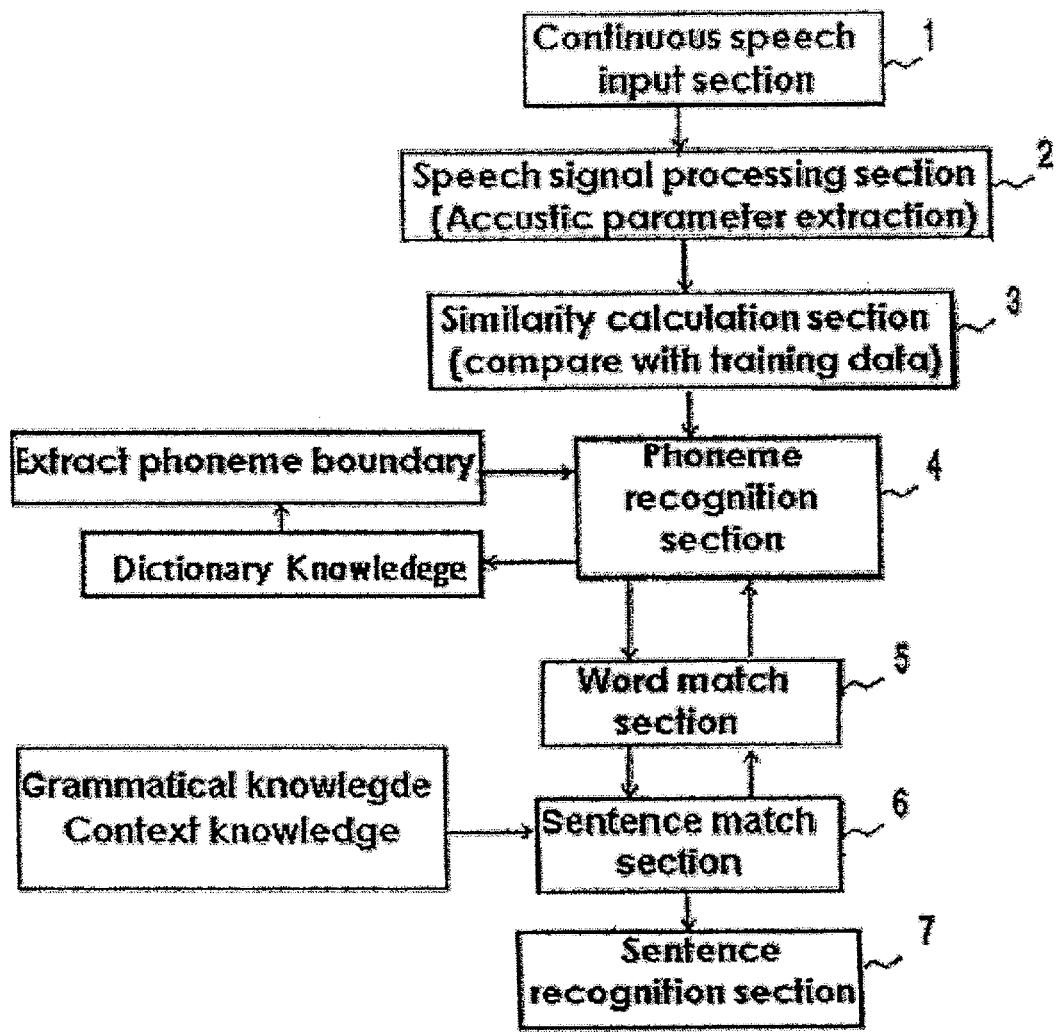
FIG. 10 is a block diagram of a conventional continuous speech recognition device.

Then, the phoneme recognition result thus generated is subject to word-level match processes and sentence-level match processes, and the results are being outputted as a continuous speech recognition result. These word-level match and sentence-level match processes may be carried out by software and/or hardware in a computer in a manner similar to the word-level match section 5 and the sentence-level match section 6 shown in FIG. 10. Further, the sentence recognition section 7 of FIG. 10 may be provided.

At the training section 13, a plurality of training speech data has been stored in a classified manner with respect to each phoneme. For each phoneme, these training data are stored in a standard form, such as the Gaussian probability density function (PDF). In such a case, at the similarity calculation section 14, each phoneme of the input data is compared with the Gaussian PDF to calculate the similarity measure.

Similarity Measure

Suppose that u represents a frame number; a represents the name of a phoneme; and $\lambda_a^u$ represents the similarity measure between the input data at a certain frame u and a particular phoneme /a/. Suppose further that the activity level at a neuron (cell) in the neural net that corresponds to the similarity measure $\lambda_a^u$ is represented by $\xi_u^a$. Then, the neural net equation (model) receives the similarity measure $\lambda_u^a$ as input, and processes the activity level $\xi_u^a$ so that the neural net converges towards a stable point. Once the stable point is reached, the recognition process is completed.

As stated above, the training data 13a stored in the training section 13 preferably is represented by the Gaussian PDF, as follows.

$$N(o; \mu_a, \Sigma_a) = \frac{1}{\sqrt{(2\pi)^n |\Sigma_a|}} e^{-\frac{1}{2}(o-\mu_a)' \Sigma^{-1} (o-\mu_a)} \quad (1)$$

where o is an input, and $\mu_a$ is a mean value of the training data for the phoneme /a/ in the cepstrum representation. $\Sigma_a$ is a covariance matrix represented by the following equation:

$$\Sigma_a = \frac{1}{N} \sum_{n=1}^{N} (o_n - \mu_a)(o_n - \mu_a)' \quad (2)$$

where $o_n$ is the training data of the phoneme /a/. If the normalized similarity measure of input data $o_u$ at the u-th frame with respect to a certain phoneme /a/ is represented by $\lambda_u^a$, then $\lambda_u^a$ is given by:

$$\lambda_u^a = \frac{|\log N(o_u; \mu_a, \Sigma_a) - <\log N>|}{<\log N>} \quad (3)$$

where <log N> means an average over phonemes at the same frame.

Figure 2:
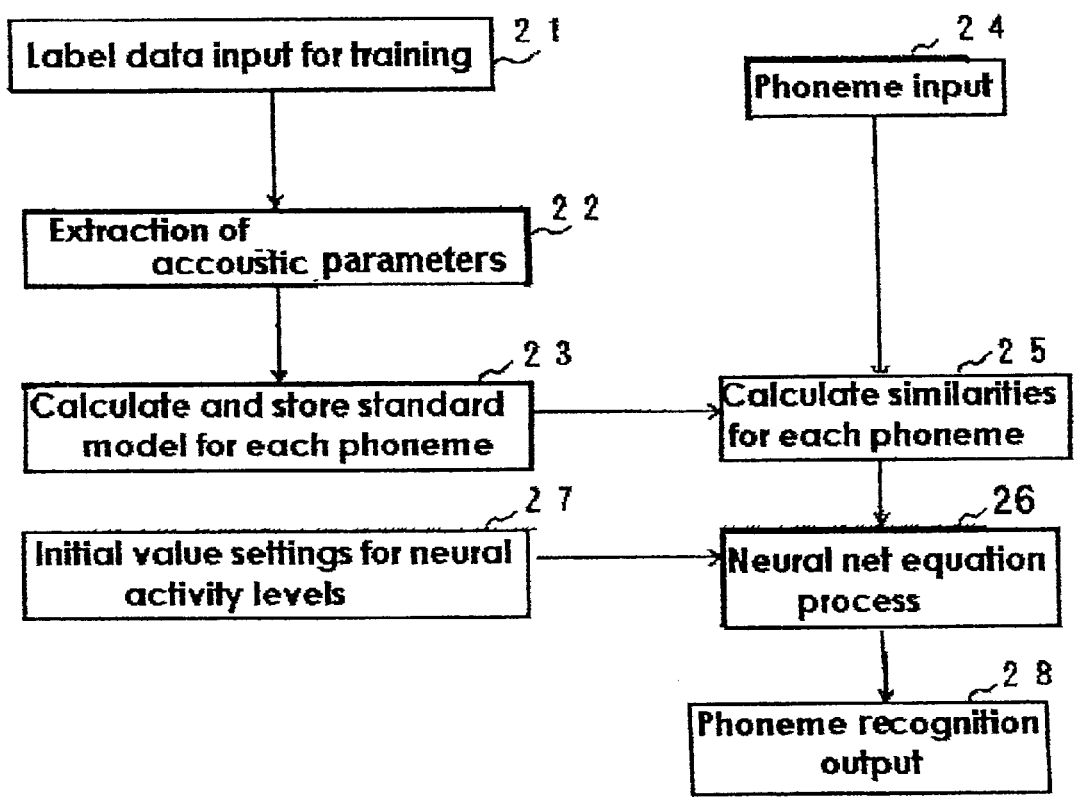
FIG. 2 is a flow chart of the speech recognition process according to the present invention.

FIG. 2 shows a flow chart of an acoustic speech recognition processing system according to a preferred embodiment of the present invention. In FIG. 2, steps 21 through 23 show the phoneme training processes. Steps 24 through 28 show phoneme recognition processes. Processes associated with continuous speech recognition, such as word-level match and sentence-level match processes, as described with reference to FIG. 10 above, may follow after step 28.

At step 21, data that have already been provided with labels at each phoneme part by specialists are utilized as the training data inputted. Phonemes are separated from these speech data based on the labels to generate a large volume of phoneme data.

At step 22, acoustic parameters are extracted from each of phoneme data at each frame.

At step 23, a standard model for each phoneme is calculated using the Gaussian probability distribution function (PDF), and is saved.

At step 24, speech data, which are an object to be recognized, are inputted. In this preferred embodiment, phoneme data that have already been divided into phonemes are used. Acoustic parameters are extracted from the phoneme data at each frame.

At step 25, the input phoneme data are compared with each of the saved standard phoneme data at each frame to calculate the similarity measures between them.

At step 26, the thus obtained similarity measures for all phonemes are substituted into a neural net equation for each frame, and are processed. Here, step 27 sets appropriate values for initial activity variables for the neural net. If the processing time needs to be shortened, the number of the similarity data processed may be reduced. For example, instead of processing the similarity data for all phonemes, the similarity data having the first to fifth largest similarity measures may selectively be processed by the equation.

At step 28, when the calculation by the neural net equation generates a stationary result, the result is outputted as a recognition result. At each frame, phonemes that have a positive neural net activity value at the output layer (final layer) become candidates for the recognition results. The phonemes that have similarity values close to zero are discarded. At each frame, a phoneme that has the highest similarity measure becomes the primary candidate, and is outputted as the recognition result.

Next, a preferred embodiment for the stereovision neural net scheme is explained with reference to equations. Stereovision neural net equations define the neural net model for performing speech recognition in the present invention, and have a competition term and a cooperation terms. Here, three examples of such a stereovision neural net equation are presented. They are: Coupled Pattern Recognition Equation, Three Layered Neural Net Equation (3LNN), and Two Layered Neural Net Equation (2LNN).

EXAMPLE A

Coupled Pattern Recognition Scheme

A Coupled Pattern Recognition Equation (scheme) is a pattern recognition equation that couples a competition term and a cooperation term. It is derived by modifying a stereovision neural net equation used in processing stereoscopic vision in such a way as to be applicable to the similarity processing for speech recognition. This is given by the following equations:

$$\dot{\xi}_u^a(t) = -\frac{dU}{d\xi_u^a(t)} \tag{4}$$

$$U(\xi_u^a(t)) = \frac{\alpha}{2}\xi_u^a(t)^2 - \frac{E}{3}\xi_u^a(t)^3 + \frac{C}{4}\xi_u^a(t)^4 \tag{5}$$

where $U(\xi_u^a(t))$ is a non-vanishing part of potential U under the derivative in equation (4), and $\xi_u^a(t)$ is a time-dependent neuron activity. In this equation, $\alpha_u^a(t)$ is given by:

$$\alpha_u^a(t) = -\lambda_u^a + (B+C)\sum_{a' \neq a}\xi_u^{a'}(t)^2 - D\sum_{u'=u-l}^{u+l}\xi_{u'}^a(t)^2 \tag{6}$$

where B, C, D, and B are positive constants. In equation (6), $\alpha_u^a(t)$ represents the activity level of a cell to which a similarity measure represented by input $\lambda_u^a$ is inputted. As shown in equation (6), $\alpha_u^a(t)$ is affected by activity levels $\xi_u^a$ of the cells with respect to other phonemes at the output layer, and by activity levels $\xi_u^a$ of the cells with respect to the same phoneme at neighboring frames. Specifically, the second term in the right hand side of equation (6) represents a competition term influenced by activity levels of other phonemes represented by $\xi_u^a$, and the third term in the right hand side of equation (6) represents a cooperation term showing cooperative coupling with activity levels for the same phoneme at neighboring frames in the range of $u-l \leq u' \leq u+l$.

The solution of this coupled pattern recognition equation is determined by initial values of $\xi$. However, as will be explained later, if the process starts from a positive value of $\xi$, the process converges to the same value regardless of the initial conditions.

Figure 3A:
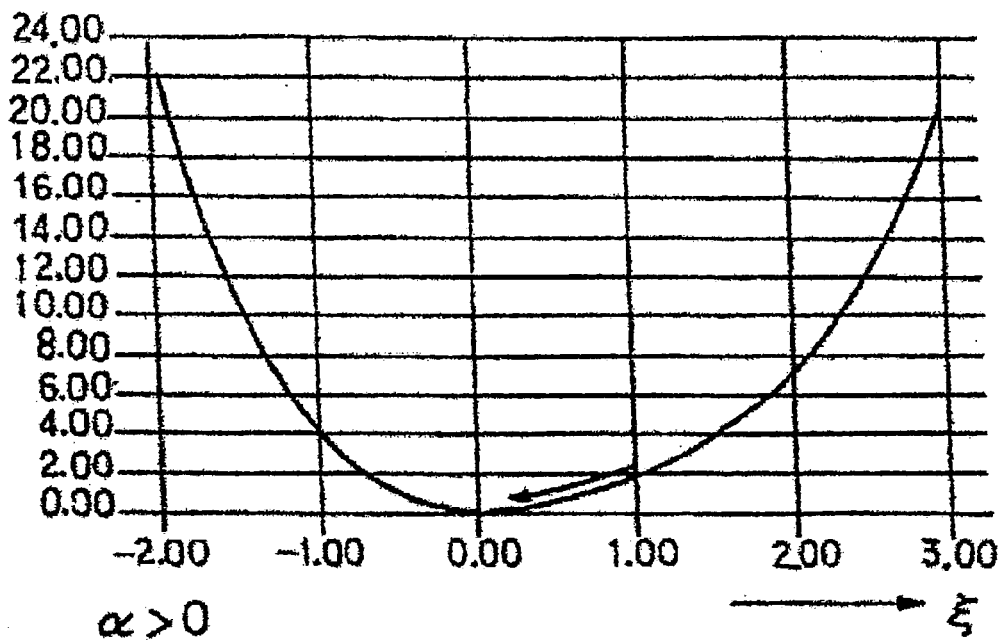
FIGS. 3A and 3B show the functional form of potential U for a coupled pattern recognition equations for different values of $\alpha$ according to a preferred embodiment of the present invention.
Figure 3B:
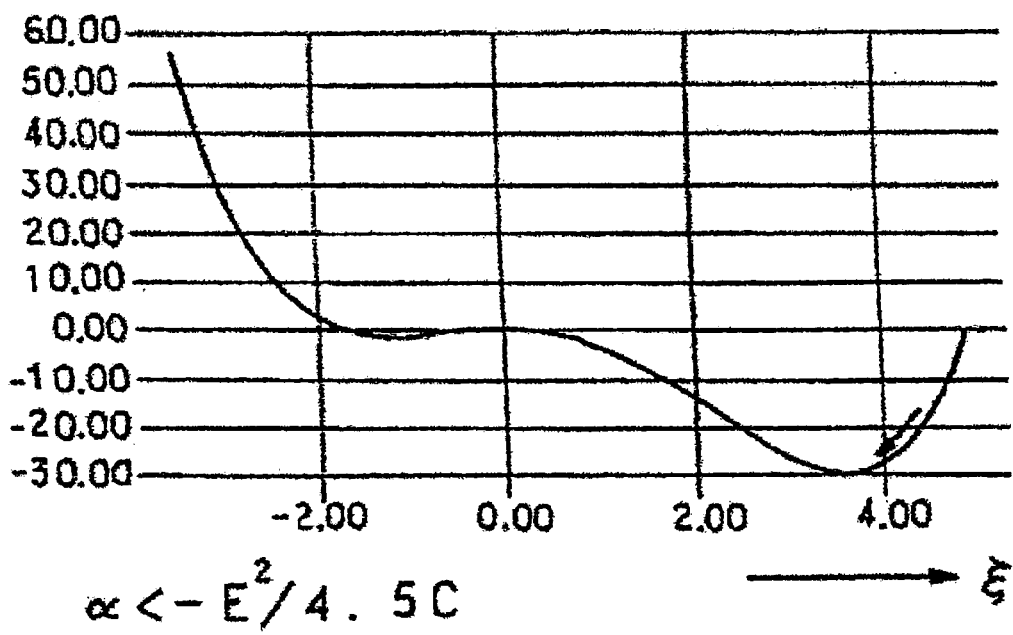

In the Coupled Pattern Recognition Equation (4) to (6), the similarity measure A is introduced to equations (4), (5), and (6) only through a, and plays important roles. FIGS. 3A and 3B show typical forms of the potential U as a function of $\xi$ represented by the above equations in the case of $\alpha$ taking a positive value ($\alpha>0$) and a negative value ($\alpha<-E^2/4.5C$) respectively. In the potential function curves in FIGS. 3A and 3B, the various constant values are chosen as B=0.25, C=1.25, D=0.60, E=3.00, and l=4.

In the potential functional curve for $\alpha>0$ shown in FIG. 3A, the value of $\xi$ changes in accordance with the Coupled Pattern Recognition Equation, and converge to zero. In the potential functional curve for $\alpha<-E^2/4.5C$ shown in FIG. 3B, if the initial value of $\xi$ is set to be a positive value, then the value of $\xi$ moves towards a positive value that corresponds to the absolute minimum of the potential functional curve. The neuron, the value $\xi$ of which reaches a positive value, called a winner neuron, and the neuron, which loses its activity, resulting in $\xi$ becoming zero, is called a loser neuron. However, in actual operations, $\alpha$ changes with time dependent upon the values of surrounding $\xi$s.

As will be explained below, using this phoneme recognition model of neural net model of Coupled Pattern Recognition Equation, the recognition rate was shown to increase in the average of more than about 8%, as compared with the conventional HMM method.

EXAMPLE B

Two Layered Neural Net Scheme

Figure 4:
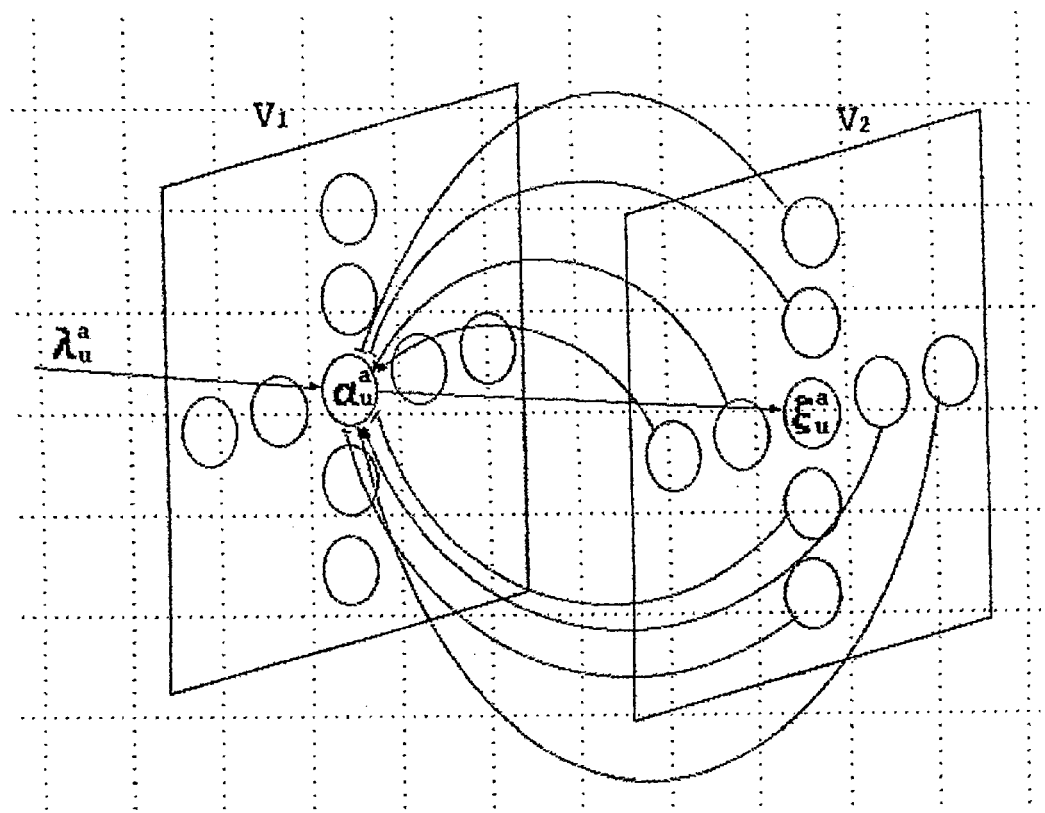
FIG. 4 shows the concept of a two-layered neural net model (2LNN) according to a preferred embodiment of the present invention.

FIG. 4 shows the two-layered neural net (2LNN) model using a two-layered neural net equation according to another embodiment of the present invention. As shown in FIG. 4, this neural net model is constructed of two layers of an input layer $V_1$ and an output layer $V_2$. On each layer, a plurality of cells (neurons) is arranged in a two-dimensional manner. Each row of cells extending in the lateral direction in the two-dimensional arrangement corresponds to one frame, and these rows are arranged in accordance with the progression of frames. Each column of cells extending in the vertical direction in the arrangement corresponds to one phoneme, and these columns are arranged in accordance with types of phoneme. The activity levels at the respective cells at the input layer and the output layer are represented by $\alpha_u^a$ and $\xi_u^a$, respectively.

Figure 6:
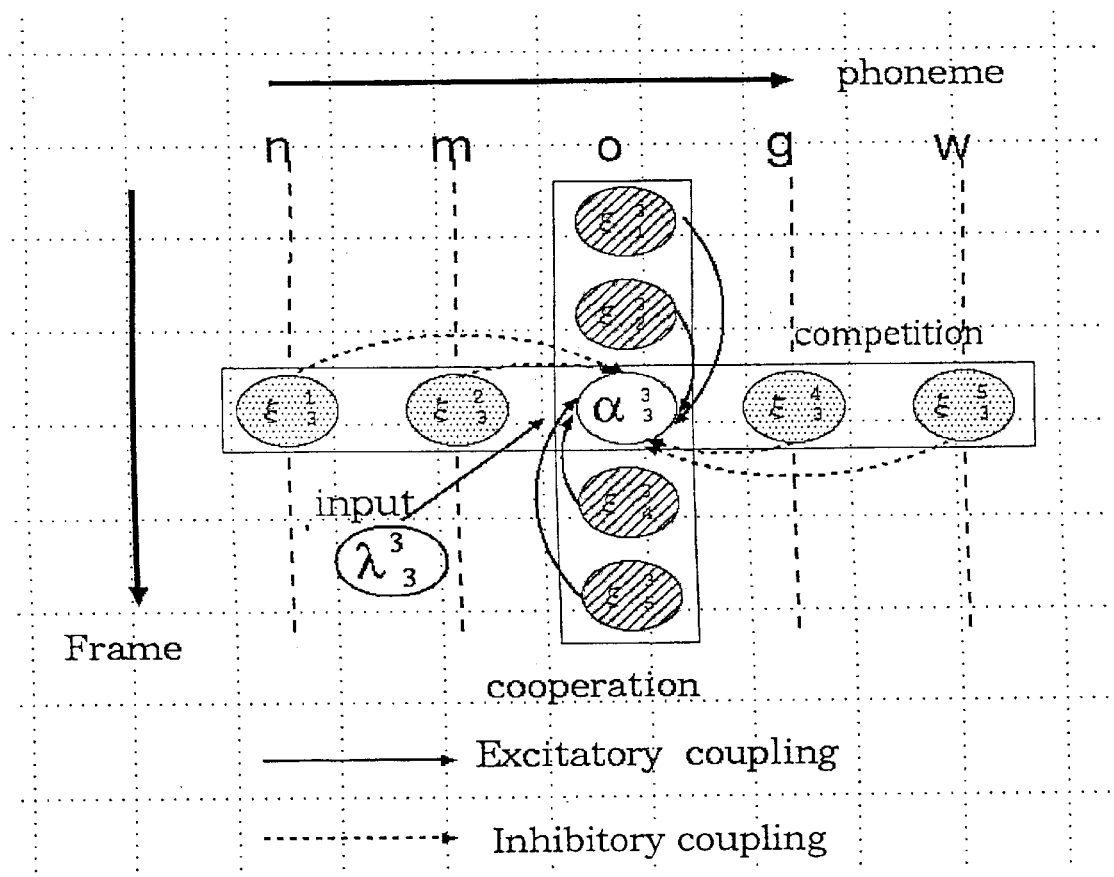
FIG. 6 schematically shows cooperation and competition among the cells in the neural net according to the present invention.

To each cell on the input layer, similarity data represented by $\lambda_u^a$ are inputted. FIG. 6 shows the dynamic process of the neural activities. As shown in FIG. 6, in yielding the value of $\alpha_3^3$, cooperation couplings occur from neighboring frame activities for the same phoneme (the solid line with arrows), and competition coupling occur from activities corresponding to different phonemes (dashed lines with arrows). The cycle of the recurrent networks eventually gives $\xi$ a high or low value in accordance with the values of $\alpha$'s. The cooperative couplings are due to a cooperative term in an equation governing the neural net process, and the competitive couplings are due to a competitive term in such an equation.

The equations used in the two-layered neural net model (2LNN) are explained next. The 2LNN developed in the present invention are given by the following equations (7) through (10):

$$\dot{\xi}_u^a(t) = -\xi_u^a(t) + f(\alpha_u^a) \tag{7}$$

where $\xi_u{}^a(t)$ is a time-dependent neuron activity.

$$\dot{\alpha}_u^a = -\alpha_u^a + A\lambda_u^a - B\sum_{a'\neq a} g(\xi_u^{a'}(t)) + D\sum_{u'=n-l}^{u+l} g(\xi_{u'}^a(t)) \quad (8)$$

where f(x) is a well known sigmoid function as shown in equation (9), and g(u) is a function given by equation (10), as follows:

$$f(x) = (\tan h(w(x-h))+1)/2 \quad (9)$$

$$g(u) = u^+ = (u+|u|)/2 \quad (10)$$

where A, B, D, w, and h are positive constants to be chosen appropriately.

Equation (8) represents time dependency of the activity level $\alpha_u{}^a(t)$. In equation (8), the second, third and forth terms in the right hand side correspond to an input, a competitive term and a cooperative term, respectively. The second term describes a similarity of input data at the u-th frame with respect to a certain phoneme /a/. The third term represents competitions with activities $\xi_u{}^{a'}(a'\neq a)$ of other phonemes. The forth term represents cooperation of activities at the neighboring frames in the same phonemes. The summation $\Sigma_{a'}$ over a' in the third term of equation (8) is taken over the range of $a-a_s \leq a' \leq a+a_s$ with $a'\neq a$ to cover an invariant search range. The summation over u' in the fourth term of equation (8) is taken over the range of $u-l \leq u' \leq u+l$ to cover a cooperative range. As shown in the equations and FIG. 4, the neuron activity $\alpha_u{}^a$ is affected by not only the input activity $\lambda_u{}^a$, but also neighboring neuron activities represented by $\xi_u{}^a$.

An equilibrium solution is obtained by solving the equations with $\dot{\xi}_u{}^a = \dot{\alpha}_u{}^a = 0$. The solution is uniquely determined independent of the initial values of ξs. With the equilibrium condition, Equation (7) is rewritten as the following equation (11):

$$\xi_u{}^a(t) = f(\alpha_u{}^a) \quad (11)$$

According to equation (11), at the equilibrium, the winner and losers in terms of $\lambda_u{}^a$ are determined by cooperation and competition mechanisms in $\alpha_u{}^a$ through the sigmoid function f(x) given by equation (9). The solution shows that the resultant value of $\xi_u{}^a$ is close to 1 when $\alpha_{u/a}$ is large, and close to zero, when $\alpha_u{}^a$ is small.

As will be described below, a superior recognition result was achieved by this model.

EXAMPLE C

Three Layered Neural Net (3LNN) Equation

Figure 5:
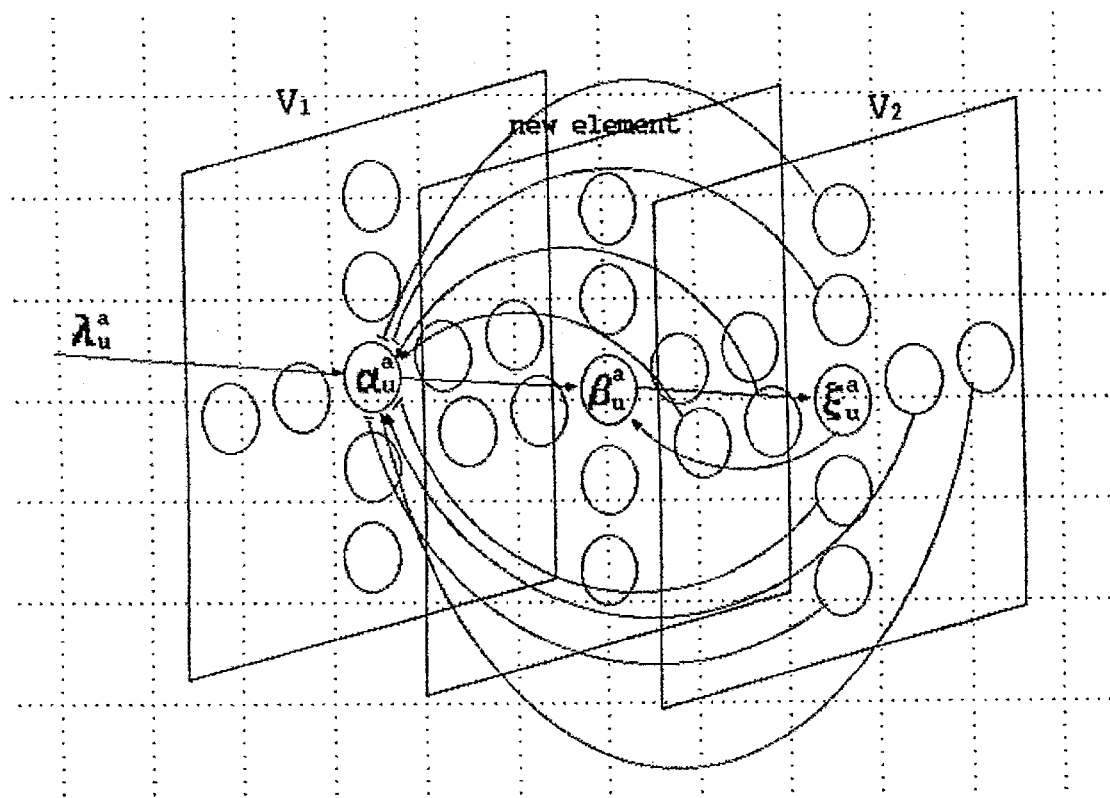
FIG. 5 shows the concept of a three-layered neural net model (3LNN) according to a preferred embodiment of the present invention.

FIG. 5 shows a Three Layered Neural Net (3LNN) model using Three-layered stereovision neural net equations according to still another preferred embodiment of the present invention. As shown in FIG. 5, the neural net model of this embodiment is constructed of three layers of an input layer $V_1$, an intermediate layer $V_n$, and an output layer $V_3$. On each layer, a plurality of cells (neurons) is arranged in a two-dimensional array. Each row of cells extending in the lateral direction in the two-dimensional arrangement corresponds to one frame, and these rows are arranged in accordance with the progression of frames. Each column of cells extending in the vertical direction in the arrangement corresponds to one phoneme, and these columns are arranged in accordance with types of phoneme. The activity levels at the respective cells at the input layer, the intermediate layer, and the output layer are represented by $\alpha_u{}^a$, $\beta_u{}^a$, and $\epsilon_u{}^a$, respectively.

To each cell on the input layer, similarity data represented by $\lambda_u{}^a$ are inputted. As in the case of two-layered neural net scheme above, FIG. 6 shows the dynamic process of the neural activities. As shown by the dashed lines with arrows, with respect to the phoneme cell represented by $\alpha_3{}^3$ in the input layer, competitive couplings occur with cells $\xi_3{}^1$, $\xi_3{}^2$, $\xi_3{}^4$, and $\xi_3{}^5$ on the output layer, which belong to the same frame, but correspond to different phoneme, to restrict excitation of the cell corresponding to $\alpha_3{}^3$. This competition is due to a competition term in the governing equations, which will be described below in detail. On the other hand, as shown in the solid lines with arrows, from cells $\xi_1{}^3$, $\xi_2{}^3$, $\xi_4{}^3$, and $\xi_5{}^3$ on the output layer that correspond to the same phoneme, but belong to adjacent different frames, cooperation couplings with $\alpha_3{}^3$ take place to promote excitation of the cell corresponding to $\alpha_3{}^3$.

The equations used in the three-layered neural net model (3LNN) are explained next. The 3LNN developed in the present invention are given by the following equations (12) and (13):

$$\dot{\xi}_u{}^a(t) = -\xi_u{}^a(t) + f(\beta_u{}^a) \quad (12)$$

$$\dot{\beta}_u{}^a = -\beta_u{}^a + g(\alpha_u{}^a) + g(\xi_u{}^a) \quad (13)$$

where $\beta_u{}^a$ is a middle layer. The first layer $\alpha_u{}^a$ is governed by the same equation (8) as in the case of the 2LNN model above. The functions f and g are also the same functions as defined by equations (9) and (10), respectively, above. The conditions on summations in equation (8) also are carried out in the same manner as explained above. Letters A, B, D, w, and h are positive constants to be chosen appropriately.

Through the third and fourth terms of equation (8), which controls development of $\alpha_u{}^a$, competition and cooperation occur in the process in the neural net. In this preferred embodiment, the middle layer $\beta_u{}^a$ is additionally provided for the purpose of further improving the recognition rate.

To understand the qualitative feature of the equations, consider an equilibrium solution defined by $\dot{\alpha}_u{}^a = \dot{\beta}_u{}^a = \dot{\xi}_u{}^a = 0$. With these conditions, equations (12) and (13) are rewritten as $$\xi_u{}^a(t) = f(g(\alpha_u{}^a) + g(\xi_u{}^a)) \quad (14)$$

Figure 7A:
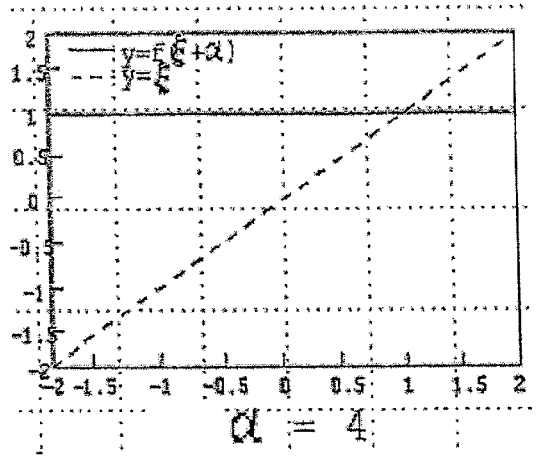
FIGS. 7A–7D shows a graph of $y=\xi$ and $y=f(g(\alpha)+g(\xi))$.
Figure 7C:
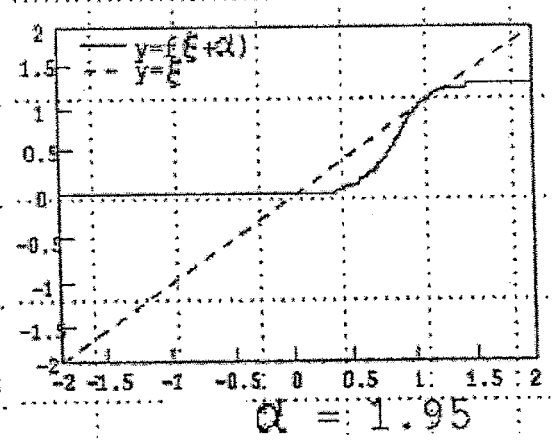
Figure 7B:
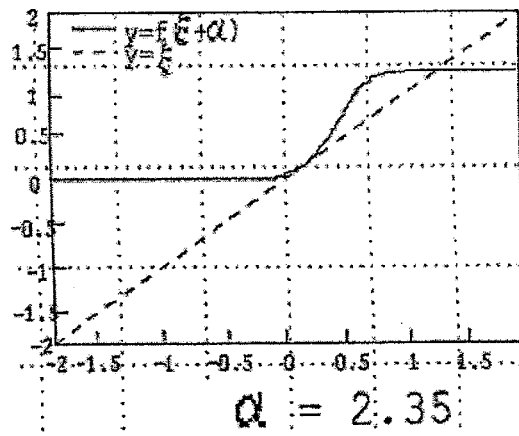
Figure 7D:
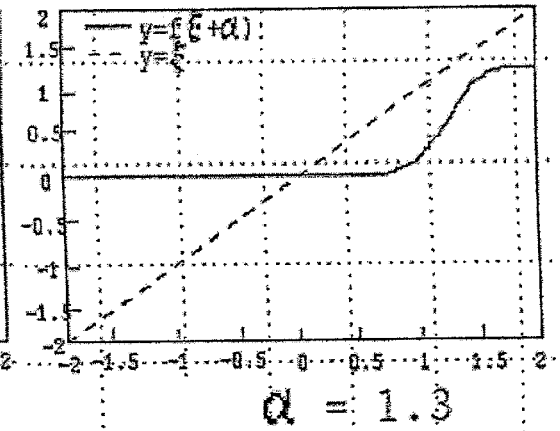

FIGS. 7A–7D plot curves y=ξ and y=f(g(α)+g(ξ)) in the ξ-y plane with various values of α ranging from 1.3 to 4. In each figure, the solution to equation (14) is given by the intersection of the two curves. As shown in FIGS. 7A–7D, as the value of α decreases from 4 to 1.3, the solution is given by $\xi_u{}^a \approx 1$ until α becomes 1.95 (FIG. 7C). On the other hand, as the value of α increases from 1.3 to 4, the solution is given by $\xi_u{}^a \approx 0$ until α reaches 2.35 about 1.95 (FIG. 7C). Thus we obtain the following two conclusions from these figures.

(1) For large α, the stable point ξ has a high value (approximately 1), whereas it has a low value (approximately 0) for small α.
(2) The change in the solution ξ accompanied by a change in α depends on whether α is increased or decreased; this means that there is a hysteresis property in the relationship between ξ and α.

Evaluation of Models

Table 1 shows the calculation result of similarities between an input phoneme, which was actually pronounced as /n/, and each phoneme from the training data, and is called a "similarity map." Here, only the top five (5) candidates are listed in terms of higher similarity measures. Here, phonemes /n/, /m/, /o/, /g/, /w/ are determined to be the best 5 candidates. Those data were processed by the 3LNN equations described above, and a single winner is determined at each frame as a phoneme that has a winning ξ. Table 2 shows an example of the results of such a process.

In this example, /n/ is the winner at frames 1 to 11, because it is the only one that has a large value of ξ and other phonemes are nearly zero. At frames 12 to 15, /m/ is the winner because it is the only one that has a large value of ξ, and other phonemes are nearly zero. Thus, by taking an average over the frames, or by judging from the frequencies of being a winner, /n/ is outputted as the recognition result.

To gain better understanding on the dynamics of these processes by the 3LNN Equation, the behavior of the Sigmoid function, which varies with the value of α, should be noted. Further, as described with reference to FIGS. 7A–7D above, the stable solution of the 3LNN equation is determined by Equation (14), which only gives a single value that is either close to 1 or close to 0. Accordingly, the initial value of ξ for every cell was set to be 0.5 in the above experiments.

TABLE 1

INPUT

| frame | /n/ | /m/ | /o/ | /g/ | /w/ |
|---|---|---|---|---|---|
| 1 | 0.172669 | 0.007747 | −0.179798 | 0.068170 | −0.317374 |
| 2 | 0.047739 | 0.021844 | 0.012022 | 0.106935 | −0.377080 |
| 3 | −0.053958 | −0.254189 | 0.174484 | 0.140137 | −0.321096 |
| 4 | −0.020677 | −0.345811 | 0.166542 | 0.152011 | −0.270617 |
| 5 | 0.071875 | −0.109546 | 0.025478 | 0.047352 | −0.181884 |
| 6 | 0.164128 | −0.066376 | −0.075502 | 0.000766 | −0.187911 |
| 7 | 0.074848 | 0.021229 | 0.011177 | −0.173780 | −0.040727 |
| 8 | 0.075048 | −0.128097 | 0.029788 | −0.138120 | 0.028273 |
| 9 | 0.151001 | −0.058196 | −0.134349 | −0.094952 | −0.014505 |
| 10 | 0.181342 | −0.005437 | −0.214245 | −0.072309 | −0.070694 |
| 11 | 0.132347 | 0.084662 | −0.163194 | −0.224362 | −0.046461 |
| 12 | 0.052027 | 0.157427 | 0.039553 | −0.173396 | −0.324618 |
| 13 | 0.112184 | 0.316814 | 0.044812 | −0.315088 | −0.632532 |
| 14 | 0.080750 | 0.277316 | 0.008593 | −0.229108 | −0.520211 |
| 15 | 0.064446 | 0.061100 | 0.028512 | −0.384859 | 0.038372 |

TABLE 2

OUTPUT = n

| frame | n | m | o | g | w |
|---|---|---|---|---|---|
| 1 | 6.282858 | −0.000000 | −0.000000 | 0.000000 | 0.000000 |
| 2 | 6.044124 | 0.000000 | 0.000000 | 0.000000 | 0.000000 |
| 3 | 5.854819 | 0.000000 | 0.000376 | 0.000001 | 0.000000 |
| 4 | 5.706682 | −0.000000 | 0.000000 | 0.000000 | 0.000000 |
| 5 | 5.582782 | −0.000000 | 0.000000 | 0.000000 | 0.000000 |
| 6 | 5.479568 | −0.000000 | 0.000000 | 0.000000 | 0.000000 |
| 7 | 5.218249 | 0.000000 | −0.000000 | 0.000000 | 0.000000 |
| 8 | 4.969046 | −0.000000 | 0.000000 | 0.000000 | 0.000000 |
| 9 | 4.728297 | 0.000000 | −0.000000 | −0.000000 | −0.000000 |
| 10 | 4.477895 | 0.000000 | 0.000000 | 0.000000 | 0.000000 |
| 11 | 4.362889 | 0.000001 | −0.000000 | −0.000000 | −0.000000 |
| 12 | 0.000006 | 3.567760 | −0.000000 | −0.000000 | −0.000000 |
| 13 | 0.000000 | 3.731247 | 0.000000 | −0.000000 | −0.000000 |
| 14 | −0.000000 | 3.905251 | −0.000000 | 0.000000 | 0.000000 |
| 15 | −0.000000 | 4.125674 | 0.000000 | −0.000000 | −0.000000 |

Figure 8:
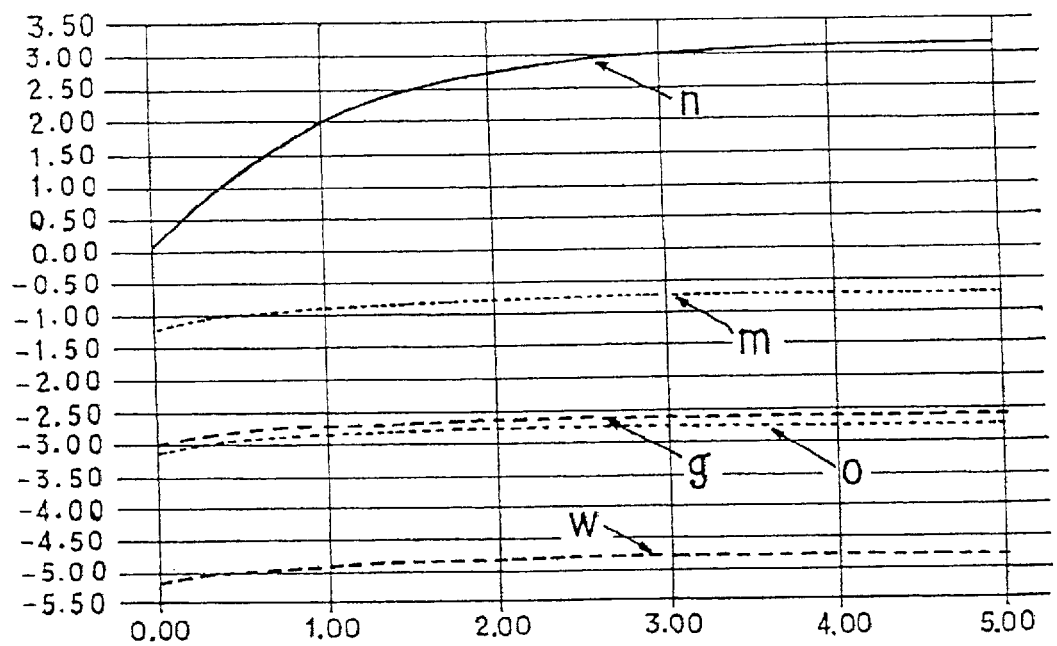
FIG. 8 is a graph showing a temporal characteristics of $\alpha$ for various phonemes.
Figure 9:
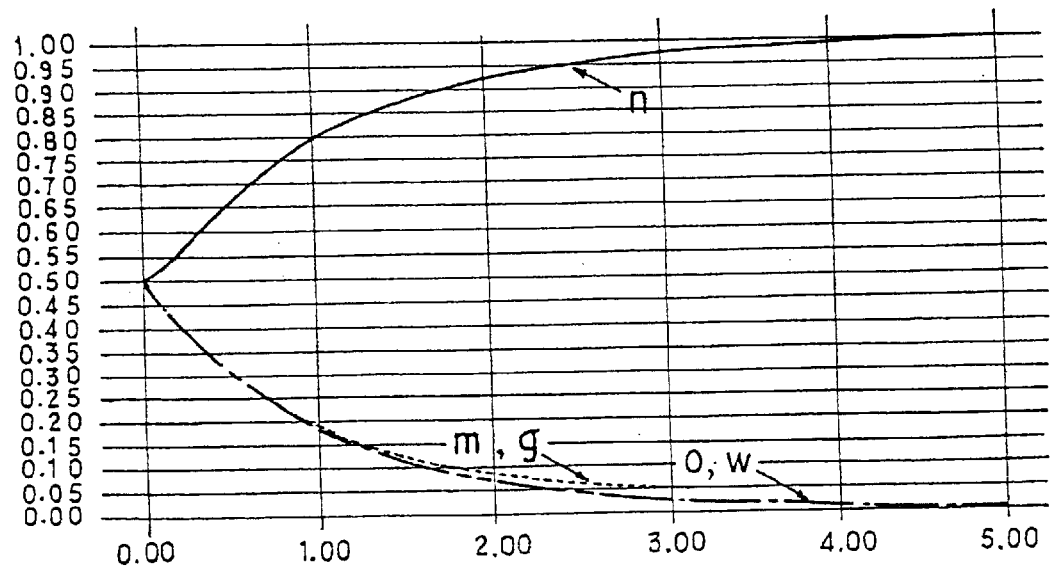
FIG. 9 is a graph showing a temporal characteristics of $\xi$ for various phonemes.

FIGS. 8 and 9 show time dependant behaviors of α and ξ, respectively, for each of the phonemes /n/, /m/, /o/, /g/, and /w/ at the 5$^{th}$ frame during the converging process with the 2LNN equation, described above. When similarity data λ for each phoneme are different, as in the example of Table 1, fifth frame, only these differences between phonemes are introduced into the 3LNN equations through α. As shown in FIG. 9, ξ for phoneme /m/, /o/, /g/, and /w/ decreases with time in accordance with the form of the Sigmoid function for α<0. On the other hand, the value of α for /n/, which has the largest value of λ, increases towards a larger positive value with time as the values of the competition term (ξ's for other phonemes) decrease. When the value of α for /n/ ($α^n$) moves towards a larger positive value, the activity level $ξ^n$ increases in accordance with the form of the Sigmoid function, as shown in FIG. 9. At this stage, the cooperation term helps increase the rate of increase in $α^n$, and $ξ^n$ accordingly increases more rapidly.

Recognition Results

To create the Gaussian probability distribution function (PDF) for each phoneme, we a extracted a total of 24 labeled phonemes from an ATR Japanese speech database composed of 4000 words spoken by 10 male speakers and from an ASJ speech database of 500 sentences spoken by 6 male speakers. Input speech data, which were to be recognized, had two kinds: (1) a database of 216 words, and (2) a database of 240 words, spoken by 3 different male speakers respectively.

Evaluation of speech recognition was conducted using 10 dimensional MFCC coefficients and their derivatives. For neural net models, the cepstrum data of each phoneme was divided into two parts, before and after the mid flame position, and used to form two Gaussian PDFs respectively. The input data were also divided into two parts and were compared to corresponding part of the Gaussian PDFs separately and a similarity map was obtained. The CPR, 2LNN and 3LNN equations were applied to these similarity maps with best 5 hypotheses among 24 kinds of phonemes. To compare our stereovision neural net models with the conventional models, the phoneme recognition tests also were performed on the same database using the Hidden Markov Model (HMM) having single mixture and three states.

The recognition results of the 3LNN model for the two databases above are listed in

TABLE 3

| Database | Model | Overall Recognition Rate |
|---|---|---|
| 216 data | HMM | 71.56% |
| 216 data | 3LNN | 78.05% |
| 240 data | HMM | 72.37% |
| 240 data | 3LNN | 78.94% |

As shown in Table 3, in both database (for input data), the 3LNN model of the present invention exhibited a superior recognition rate than that in the conventional HMM model.

The overall speaker independent recognition results and performance improvements among acoustic models for the database with 216 words are listed in Table 4.

TABLE 4

| Pho | HMM | CPR | 2LNN | 3LNN |
|---|---|---|---|---|
| NG | 59.62 | 89.03 | 84.81 | 89.03 |
| a | 93.85 | 96.67 | 95.03 | 96.41 |
| b | 86.79 | 86.79 | 74.68 | 86.79 |
| ch | 100.00 | 75.00 | 78.46 | 83.33 |
| d | 74.07 | 59.26 | 64.06 | 62.96 |
| e | 80.86 | 96.30 | 86.36 | 96.30 |
| g | 45.71 | 44.44 | 46.75 | 38.89 |

TABLE 4-continued

| Pho | HMM | CPR | 2LNN | 3LNN |
|-----|-----|-----|------|------|
| h   | 53.33 | 60.00 | 50.00 | 60.00 |
| i   | 84.18 | 97.98 | 85.71 | 96.97 |
| j   | 93.10 | 93.10 | 94.02 | 93.10 |
| k   | 67.02 | 61.70 | 61.18 | 58.16 |
| m   | 86.67 | 66.67 | 44.33 | 60.00 |
| n   | 50.00 | 50.00 | 40.00 | 50.00 |
| o   | 66.67 | 90.79 | 92.18 | 89.45 |
| p   | 100.00 | 77.78 | 61.53 | 77.78 |
| r   | 42.30 | 32.00 | 28.94 | 35.65 |
| s   | 76.40 | 80.90 | 90.10 | 78.65 |
| sh  | 91.11 | 95.56 | 84.21 | 95.56 |
| t   | 15.38 | 48.72 | 33.33 | 48.72 |
| ts  | 89.74 | 89.74 | 86.95 | 89.74 |
| u   | 59.80 | 68.67 | 61.66 | 68.00 |
| w   | 91.03 | 78.91 | 54.54 | 74.15 |
| y   | 87.30 | 91.67 | 63.63 | 92.86 |
| z   | 93.10 | 93.33 | 66.67 | 93.33 |
| ALL | 72.37% | 79.53% | 77.41% | 78.94% |

In performing recognitions, various parameters in the respective equations were set as: A=3.0(3.0), B=3.5(3.5), D=1.5(2.0), w=2.5(1.0), h=0.5(0.5), l=4 for the 3LNN (2LNN), and B=0.25, C=1.25, D=0.60, E=3.00, l=4 for CPR.

As shown in Table 4, with the 216 word database, as compared with the conventional HMM model, the average recognition rates were approximately 7.2% higher in the CPR scheme; 5.1% higher in the 2LNN scheme; and 6.6% higher in the 3LNN scheme than the performances of HMMs, respectively. Thus, the speech recognition system of the present invention produced superior recognition results, as compared with the conventional recognition system of the HMM scheme.

Continuous Speech Recognition

The speech recognition system according to the present invention also was evaluated for continuous speech. The three layered neural net scheme explained above was used for constructing the continuous speech system. For continuous speech, it is considered that input data $\lambda_u^a$ are fed to the slightly modified 3LNN equations (15), (16), and (20) below, and the activities $\alpha$, $\beta$, and $\xi$ in the network develop their values toward a stable point.

$$\tau_1 \dot{\xi}_u^a(t) = -\xi_u^a(t) + f(\beta_u^a) \quad (15)$$

$$\tau_2 \dot{\alpha}_u^a = -\alpha_u^a + A\lambda_u^a - B\sum_{a' \neq a} g(\xi_u^{a'}(t)) + D \sum_{u'=n-l1}^{u+l2} g(\xi_{u'}^a(t)) \quad (16)$$

$$\tau_3 \dot{\beta}_u^a = -\beta_u^a + g(\alpha_u^a) + g(\xi_u^a) \quad (17)$$

The phoneme recognition of a phoneme (for example /a/) at the u-th frame is realized if $\xi_u^a$ approaches to 1, while it is not recognized as such if $\xi_u^a$ approaches to 0. Here, as seen from these equations, the parameters $\tau_1$, $\tau_2$, and $\tau_3$ control the rate of changes in the respective equations. In this continuous speech recognition, we put $\tau_2$, $\tau_3 \ll \tau_1 = 1$ so that equation (15), (16), and (17) are simply written as:

$$\dot{\xi}_u^a(t) = -\xi_u^a(t) + f(g(\xi_u^a)) \quad (18)$$

$$\alpha_u^a = A\lambda_u^a - B\sum_{a' \neq a} g(\xi_u^{a'}(t)) + D \sum_{u'=n-l}^{u+l} g(\xi_{u'}^a(t)) \quad (19)$$

It should be noted that the equations (18) and (19) give the same solution as that with equations (15), (16), and (17) as long as the stable solution is unique. Differential equations (18), (19) are numerically solved with N steps of loop divided into discrete time $\Delta t$. Thus, $\xi$ develops as $\xi(t)$, $\xi(t+\Delta)$, ... to $\xi(t+N\Delta t)$.

To treat data flow $\lambda_u^a$ sequentially, the input data are inputted into a window with L frames and the neural network equations (18) and (19) processes the L frame data for N steps. Then, the data are passed one frame forward through the window, where the initial values of $\xi$ are set to zero before entering to the window. The procedure is described in more detail as follows.

When input data $\xi_{u+L-1}^a, \lambda_{u+L-2}^a, \ldots \lambda_u^a$ are entered inside the window, equations (18) and (19) develop activities $\xi(t)$ until it arrives at $\xi_u^a(t+N\Delta t)$ for u'=u,u+1, ..., u+L−1. Then, new data $\lambda_{u+L}^a$ enter into the window from the left, and the old data $\lambda_u^a$ get out from the window. At the same time whole $\xi_u^a$ are shifted to $\xi_{u-L}^a$, setting the initial values of $\xi_{u-1}^a$ for the next N step loop calculations. At this time, new $\xi_{u+L}^a$ enter into the window and the last $\xi_u^a$ is outputted from the window as a final value of $\xi$ within that window. The judgment whether a phoneme (for example, /a/) is recognized at the u-th frame is conducted based upon whether the final $\xi$ is close to 1 or 0, respectively. A sequence of the same processes continues until the whole input data go through the window completely and the whole values of final $\xi$ are obtained.

Thus, in the continuous recognition system of the present preferred embodiment of the present invention, the converging processes in the 3LNN equations (or some other scheme described above) take place within each time window until the new input data come in (until the beginning of the next time window, for example), and the best result in such a temporal window is outputted as the recognition result.

Evaluation of Continuous Recognition System

A continuous speech recognition system with the 3LNN equations (18) and (19) was constructed to evaluate its performance. In order to construct Gaussian PDFs for each phoneme (reference phoneme database), a total 24 labeled phonemes were extracted from ATR Japanese speech database composed of 4000 words spoken by 10 male speakers and from ASJ speech database of 500 sentences by 6 male speakers. Input data to be recognized were constructed of 42 words. The sampling parameters at the speech input and processing sections are listed in Table 5.

TABLE 5

| Sampling rate | 16 kHz, 16 bit |
|---|---|
| Pre-emphasis | 0.97 |
| Window function | 16 ms Hamming window |
| Frame period | 5 ms |
| Feature parameters | 10-order MFCC + 10-order Δ MFCC |

Figure 11:
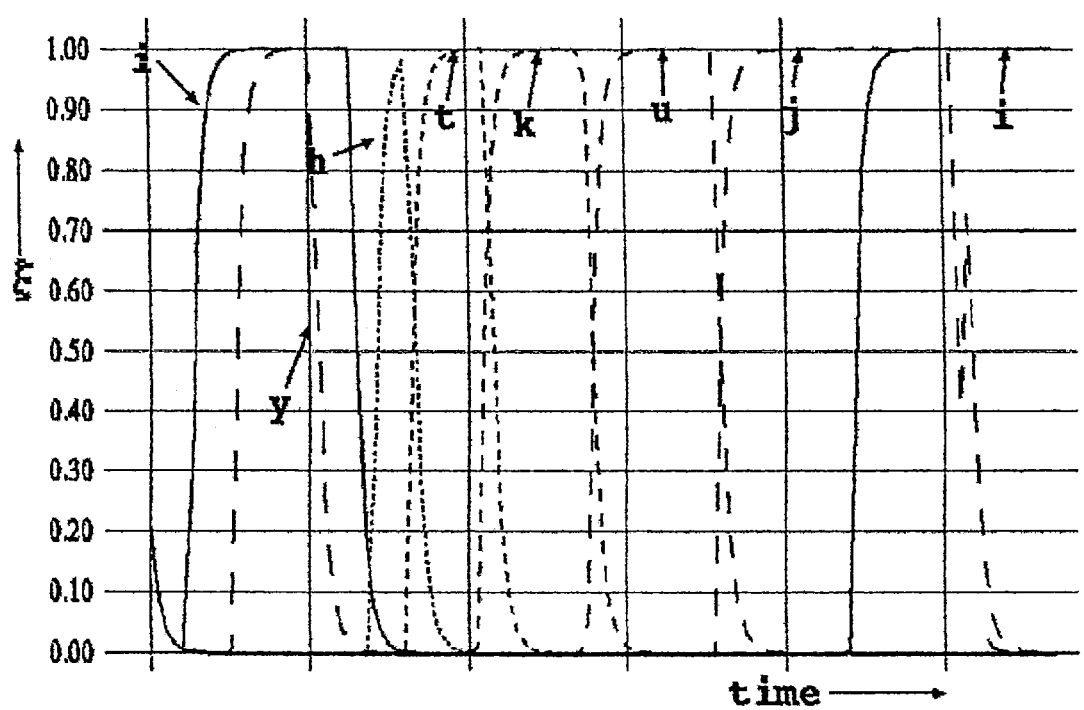
FIG. 11 shows a result of continuous speech recognition according to the present invention.

FIG. 11 plots the best two $\xi_u^a$ outputs obtained in the window using the window scheme described above when a word "/i/ /k/ /u/ /j/ /i/" was pronounced. In FIG. 11, the best two of $\xi$'s are selected and plotted against frames (time). Here parameters are set as follows: window size L=10, $\Delta t$=0.01, N=100, A=6.0, B=6.5, D=1.5, w=2.5, h=0.5, $l_1$=6, and $l_2$=0.

In FIG. 11, the best $\xi$'s are read sequentially as /i/ /h/ /t/ /k/ /u/ /j/ /i/. It is noted that /y/ has a rather high value following /i/, because /y/ resembles to /i/. The phonemes /h/ and /t/ were not contained in the inputted word, "/i/ /k/ /u/ /j/ /i/." It is considered that these wrong phonemes entered into the result due to context dependent effects between /y/ and /k/.

In this system, a first step for a word recognition was achieved by ignoring phonemes that appear less than successive three frames. For examples, if a sequence obtained is AAABBCCC, then, the resultant word is "AC." in short. In the example of FIG. 11, the result is /i/ /h/ /t/ /k/ /u/ /j/ /i/.

Figure 12:
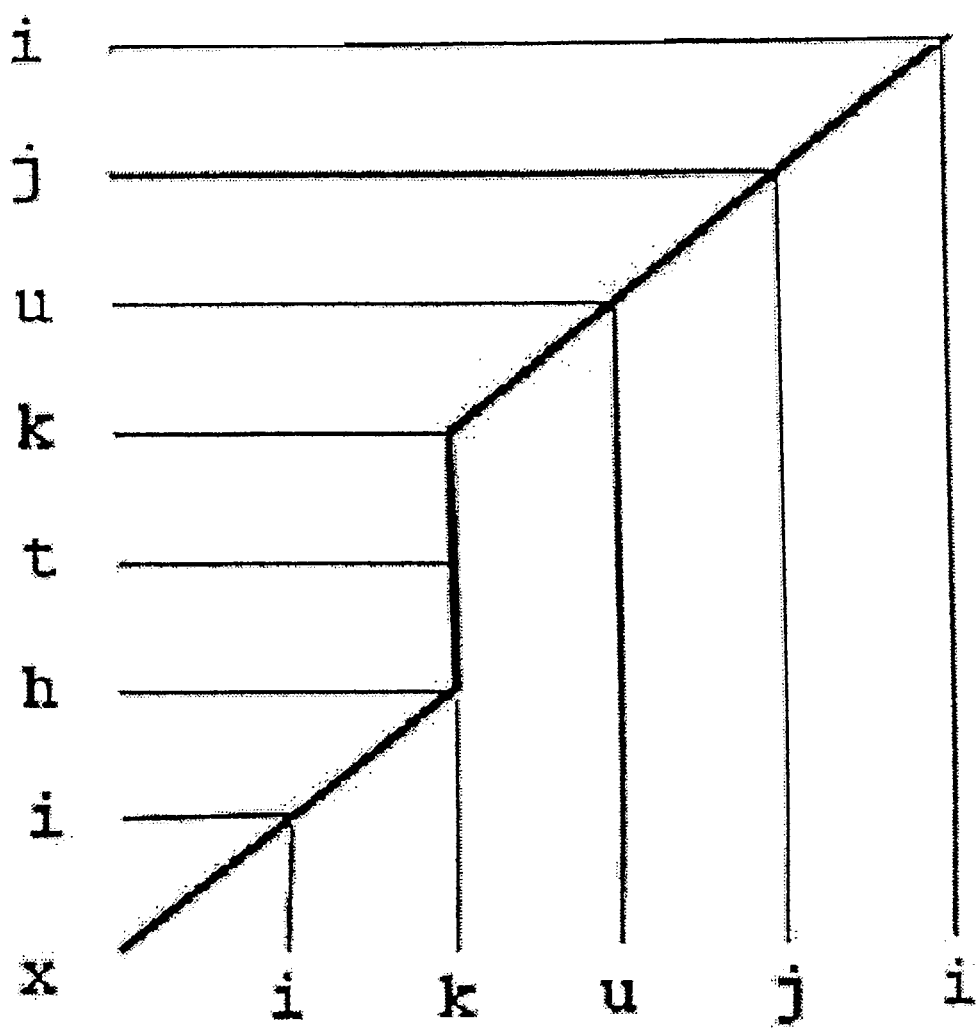
FIG. 12 shows a DP matching between a captured word "ihtkuji" and an input word "ikuji" according to the present invention.

After this preparation, DP matching was conducted where a distance table among phonemes was provided by grouping similar phonemes. The resulting DP matching is shown in FIG. 12, which compares "ihtkuji" with "ikuji." A lattice point shows a distance between phonemes. In the example of FIG. 12, $d(i,i)=d(u,u)=d(j,j)=d(k,k)=0$, $d(k,h)=d(k,t)=0.4$ and the total distance D becomes $D=0.8$.

The continuous speech recognition system was constructed as described above, and evaluated. Among 42 words inputted, 38 words were correctly recognized by this system, achieving a 90% recognition rate.

As described above, in addition to use of the newly developed neural net equations, such as CPR, 2LNN, and 3LNN, in speech recognition, the continuous speech recognition system of the present invention utilizes a window, to which new acoustic data enter and from which final neural activities are output, to accommodate a sequential data flow in continuous speech recognition. Inside the window, recurrent neural network develops neural activities toward a stable point. The process is called Winner-Take-All (WTA) with cooperation and competition, as described above. The evaluation of the system revealed that the resulting neural activities clearly exhibits recognition of a word in continuous speech. The string of phonemes obtained is compared with reference words by using DP matching. The recognition results achieved were 90%. Additional advantages of the present invention is that it does not require many parameters to be adjusted and the algorithm for recognition is simple.

In the present invention, neural net schemes with competition and cooperation are developed to provide a significantly improved recognition rate of phonemes. Stereovision neural net models developed in the present invention are fundamentally different and new approaches from the conventional HMM model. The tests showed the present invention achieves significant improvement in the phoneme recognition rate. The present invention also applies this newly developed scheme for speech recognition to continuous word recognition and obtained superior word recognition result. The present invention also provides a speech recognition system having such phoneme recognition scheme and word recognition scheme together with sentence recognition scheme. Thus, the present invention provides a speech recognition system having an excellent recognition capability.

Figure 13:
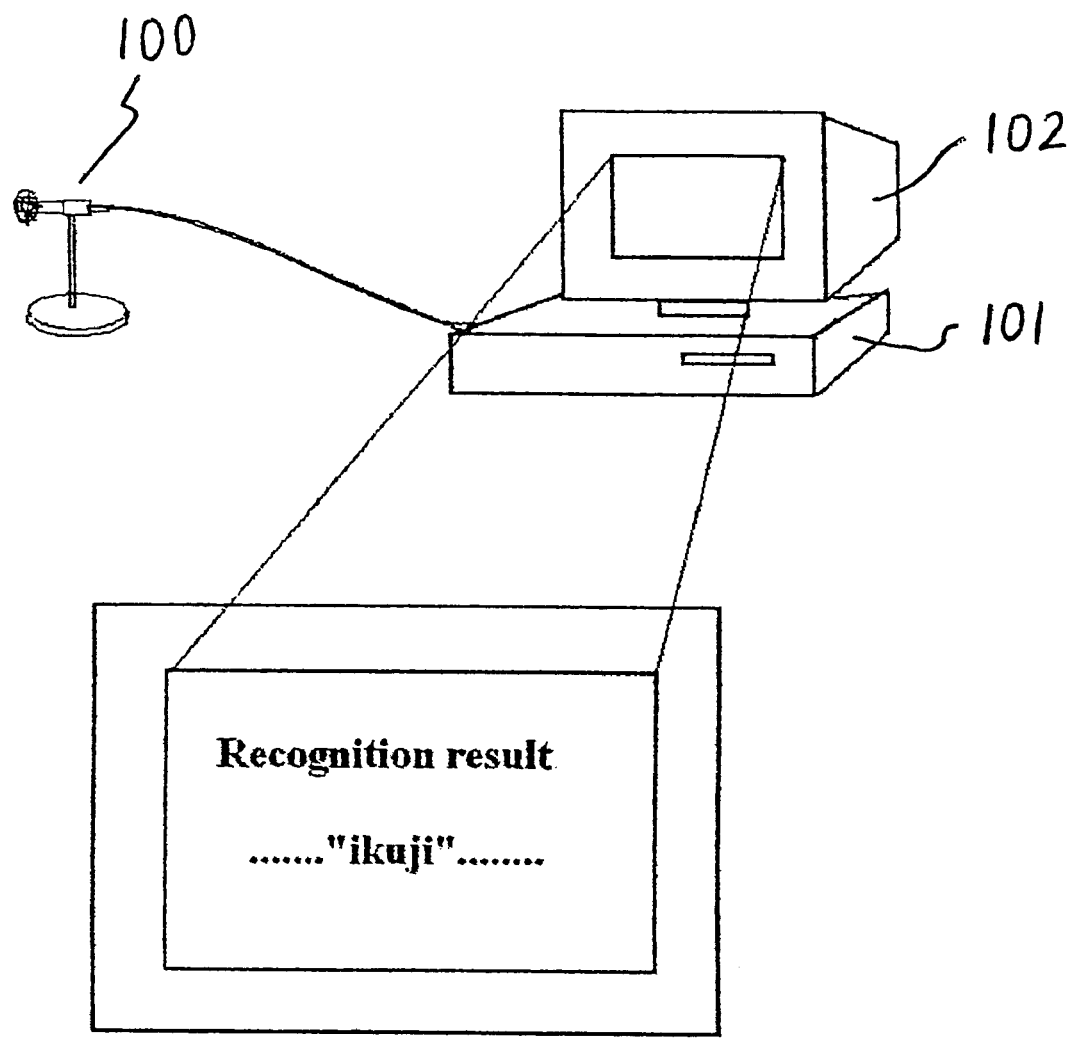
FIG. 13 shows a schematic construction of the speech recognition system according to the present invention.

FIG. 13 shows a schematic construction of the speech recognition system according to the present invention. The neural net schemes with cooperation and competition of the present invention, described above, include a microphone 100 for inputting speech data to be recognized and a computer 101 equipped with appropriate hardware and software. In the working examples described above, the similarity calculation section 14 and the phoneme recognition section 15 of FIG. 1 were implemented in the form of software running on the computer 101, and the training section 13 was constructed of software and a hard drive installed in the computer. The hard drive stores the training data to be compared with the input data in the similarity calculation section 14. Further, as shown in FIG. 13, a CRT monitor 102 is provided for displaying the recognition results. By confirming the recognition result through the computer, a user may perform additional correction or modification operation, if desired. Also, the recognized words can be used as an instruction to the computer 101, and/or stored in the computer in the text format or other word processor format for editing and word processing purposes.

Alternatively, the above functions implemented in the form of software here may be implemented in the form of hardware, using specially designed processors and chip sets, if desired.

Based upon the concrete forms of novel equations to be employed in conducting speech recognition of the present invention, as provided above, constructions of software and/or hardware for solving these differential equations would be apparent to engineers in the art. For example, the C-language based software, and PC-based hardware may be used. Furthermore, a main frame computer having a superior processing power may preferably be employed especially in the case of continuous speech recognition above.

As described above, according to the speech recognition system of the present invention, a superior recognition rate can be achieved by utilizing a newly developed neural net scheme having competition and cooperation couplings, providing superior utility and functionality.

It will be apparent to those skilled in the art that various modifications and variations can be made in the speech recognition scheme and system of the present invention without departing from the spirit or scope of the invention. Thus, it is intended that the present invention cover the modifications and variations of this invention provided they come within the scope of the appended claims and their equivalents.

What is claimed is:

1. A method for speech recognition, comprising the steps of:

preparing training data representing acoustic parameters of each of phonemes at each time frame, the training date being represented by a distribution function;

receiving an input signal representing a sound to be recognized and converting the input signal to input data;

comparing the input data at each frame with the distribution function representing the training data of each of the phonemes to derive a similarity measure of the input data with respect to each of the phonemes;

processing the similarity measures obtained in the comparing step using a neural net model differential equations governing development of time-dependent activities of plural cells to conduct speech recognition of the input signal, each cell being associated with one respective phoneme and one frame, the step including numerically and recurrently solving coupled differential pattern recognition equations to produce a cell having the highest activity at each of the frames, the couple differential pattern recognition equations being such that a time-dependent development of the activity of each cell at each frame in the neural net model is dependent upon the similarity measured and is suppressed by the activities of other cells on the same frame corresponding to different phonemes, the time-dependent development of the activity of each cell at each frame is enhanced by the activities of other cells corresponding to the same phoneme at different frames, and the phoneme of a cell that has developed the highest activity is determined as a winner at the corresponding frame to produce a list of winners at respective frames; and outputting a phoneme as a recognition result for the input signal in accordance with the list of the winners at the respective frames that have been determined in the step of processing.

2. The method according to claim 1, wherein the distribution function representing the training data is a Gaussian probability density function.

3. The method according to claim 1, wherein the step of processing includes numerically solving two-layered coupled neural net differential equations governing development of the time-dependent activities of the cells of respective two layers to produce the cell having the highest activity at each of the frames.

4. The method according to claim 3, wherein the step of numerically solving two-layered coupled neural net differential equations governing development of the time-dependent activities of the cells of respective two layers includes numerically and recurrently solving coupled differential pattern recognition equations given by the following equations:

$$\tau_1 \dot{\xi}_u^a(t) = -\xi_u^a(t) + f(\alpha_u^a)$$

$$\tau_2 \dot{\alpha}_u^a = -\alpha_u^a + A\lambda_u^a - B\sum_{a' \neq a} g(\xi_u^{a'}(t)) + D \sum_{u'=n-l}^{u+l} g(\xi_{u'}^a(t))$$

where $\lambda_a^u$ represents the similarity measure between the input data at a certain frame u and a particular phoneme /a/, $\xi_u^a(t)$ is the time-dependent activities of a cell in an output layer, the highest activities thereof being to be determined, $\alpha_u^a(t)$ represents the time-dependent activity level of a cell to which a similarity measure represented by input $\lambda_u^a$ is inputted and is in a first input layer, A, B, D, $\tau_1$, and $\tau_2$ are constants, and f(x) and g(u) are given by:

$$f(x) = (\tan h(w(x-h)) + 1)/2$$

$$g(u) = u^+ = (u + |u|)/2,$$

where w and h are constants.

5. The method according to claim 1, wherein the step of processing includes numerically solving three-layered coupled neural net differential equations governing development of the time-dependent activities of the cells of respective three layers to produce the cell having the highest activity at each of the frames.

6. The method according to claim 5, wherein the step of numerically solving three-layered coupled neural net differential equations governing development of the time-dependent activities of the cells of respective three layers includes numerically and recurrently solving coupled differential pattern recognition equations given by the following equations:

$$\tau_1 \dot{\xi}_u^a(t) = -\xi_u^a(t) + f(\beta_u^a)$$

$$\tau_2 \dot{\alpha}_u^a = -\alpha_u^a + A\lambda_u^a - B\sum_{a' \neq a} g(\xi_u^{a'}(t)) + D \sum_{u'=n-l1}^{u+l2} g(\xi_{u'}^a(t))$$

$$\tau_3 \dot{\beta}_u^a = -\beta_u^a + g(\alpha_u^a) + g(\xi_u^a)$$

where $\lambda_a^u$ represents the similarity measure between the input data at a certain frame u and a particular phoneme /a/, $\xi_u^a(t)$ is the time-dependent activities of a cell in an output layer, the highest activities thereof being to be determined, $\alpha_u^a(t)$ represents the time-dependent activity level of a cell to which a similarity measure represented by input $\lambda_u^a$ is inputted and is in a first input layer, $\beta_u^a$ represents a cell in a middle layer, f(x) and g(u) are given by:

$$f(x) = (\tan h(w)(x-h)) + 1)/2$$

$$g(u) = u^+ = (u + |u|)/2$$

and A, B, D, w, h, $\tau_1$, $\tau_2$, and $\tau_3$, are constants.

7. The method according to claim 1, further comprising the step of identifying at least one of a word and a sentence based upon the recognition result obtained in the step of outputting.

8. The method according to claim 1, wherein the step of outputting includes displaying the recognition result on a display monitor.

9. The method according to claim 1, wherein in the step of processing, only phonemes that have the highest to fifth highest similarity measures are processed.

10. The method according to claim 1, wherein the step of receiving the input signal includes receiving a continuous speech through a plurality of time windows each having a fixed time interval, and wherein the step of processing and the step of outputting are repeated for every time window.

11. A speech recognition device, comprising:

a training unit for storing training data representing acoustic parameters of each of phonemes at each time frame, the training date being represented by a distribution function;

a signal input unit for receiving an input signal representing a sound to be recognized and for converting the input signal to input data;

a similarity calculation unit for comparing the input data at each frame with the distribution function representing the training data of each of the phonemes to derive a similarity measure of the input data with respect to each of the phonemes; and a processing unit for processing the similarity measures obtained by the similarity calculation unit using a neural net model differential equations governing development of time-dependent activities of plural cells to conduct speech recognition of the input signal, each cell being associated with one respective phoneme and one frame, the processing unit numerically and recurrently solving coupled differential pattern recognition equations to produce a cell having the highest activity at each of the frames, the couple differential pattern recognition equations being such that a time-dependent development of the activity of each cell at each frame in the neural net model is dependent upon the similarity measured and is suppressed by the activities of other cells on the same frame corresponding to different phonemes, the time-dependent development of the activity of each cell at each frame is enhanced by the activities of other cells corresponding to the same phoneme at different frames, and the phoneme of a cell that has developed the highest activity is determined as a winner at the corresponding frame to produce a list of winners at respective frames, the processing unit outputting a phoneme as a recognition result for the input signal in accordance with the list of the winners at the respective frames that have been determined.

12. The device according to claim 11, wherein the distribution function representing the training data is a Gaussian probability density function.

13. The device according to claim 11, wherein the processing unit is adapted to numerically solve two-layered coupled neural net differential equations governing development of the time-dependent activities of the cells of respective two layers to produce the cell having the highest activity at each of the frames.

14. The device according to claim 13, wherein the processing unit is adapted to numerically solve two-layered coupled neural net differential equations governing development of the time-dependent activities of the cells of respective two layers by numerically and recurrently solving coupled differential pattern recognition equations given by the following equations:

$$\tau_1 \dot{\xi}_u^a(t) = -\xi_u^a(t) + f(\alpha_u^a)$$

$$\tau_2 \dot{\alpha}_u^a = -\alpha_u^a + A\lambda_u^a - B\sum_{a' \neq a} g(\xi_u^{a'}(t)) + D \sum_{u'=n-l}^{u+l} g(\xi_{u'}^a(t))$$

where $\lambda_a^u$ represents the similarity measure between the input data at a certain frame u and a particular phoneme /a/, $\xi_u^a(t)$ is the time-dependent activities of a cell in an output layer, the highest activities thereof being to be determined, $\alpha_u^a(t)$ represents the time-dependent activity level of a cell to which a similarity measure represented by input $\lambda_{u/a}$ is inputted and is in a first input layer, A, B, D, $\tau_1$, and $\tau_2$ are constants, and f(x) and g(u) are given by:

$$f(x) = (\tan h(w(x-h)) + 1)/2$$

$$g(u) = u^+ = (u + |u|)/2$$

where w and h are constants.

15. The device according to claim 11, wherein the processing unit is adapted to numerically solve three-layered coupled neural net differential equations governing development of the time-dependent activities of the cells of respective three layers to produce the cell having the highest activity at each of the frames.

16. The device according to claim 15, wherein the processing unit is adapted to numerically solve three-layered coupled neural net differential equations governing development of the time-dependent activities of the cells of respective three layers by numerically and recurrently solving coupled differential pattern recognition equations given by the following equations:

$$\tau_1 \dot{\xi}_u^a(t) = -\xi_u^a(t) + f(\beta_u^a)$$

$$\tau_2 \dot{\alpha}_u^a = -\alpha_u^a + A\lambda_u^a - B\sum_{a' \neq a} g(\xi_u^{a'}(t)) + D \sum_{u'=n-l1}^{u+l2} g(\xi_{u'}^a(t))$$

$$\tau_3 \dot{\beta}_u^a = -\beta_u^a + g(\alpha_u^a) + g(\xi_u^a)$$

where $\xi_u^a(t)$ is the time-dependent activities of a cell in an output layer, the highest activities thereof being to be determined, $\alpha_u^a(t)$ represents the time-dependent activity level of a cell to which a similarity measure represented by input $\lambda_u^a$ is inputted and is in a first input layer, $\beta_u^a$ represents a cell in a middle layer, f(x) and g(u) are given by:

$$f(x) = (\tan h(w(x-h)) + 1)/2$$

$$g(u) = u^+ = (u + |u|)/2$$

and A, B, D, w, h, $\tau_1$, $\tau_2$, and $\tau_3$, are constants.

17. The device according to claim 11, wherein the processing unit further identifies at least one of a word and a sentence based upon the recognition result.

18. The device according to claim 11, further comprising a display monitor for displaying the recognition result.

19. The device according to claim 11, wherein the processing unit processes only phonemes that have the highest to fifth highest similarity measures.

20. The method according to claim 11, wherein the signal input unit receives a continuous speech through a plurality of successive time windows each having a fixed time interval.

* * * * *